United States Patent [19]

Tsao

[11] 4,246,417
[45] Jan. 20, 1981

[54] TREATMENT OF WASTE WATER FROM NITRILE PRODUCTION

[75] Inventor: Utah Tsao, Jersey City, N.J.

[73] Assignee: The Lummus Company, Bloomfield, N.J.

[21] Appl. No.: 905,958

[22] Filed: May 15, 1978

[51] Int. Cl.³ ............ C07D 213/57; C07C 121/54; C07C 121/56; C07C 121/30
[52] U.S. Cl. ............ 546/286; 260/465 C; 260/465.3; 260/465.9; 203/10; 203/25; 203/96; 203/DIG. 3
[58] Field of Search ............ 260/294.9, 465 C, 465.3, 260/465.9; 203/10, 25, 96; 546/286

[56] References Cited

U.S. PATENT DOCUMENTS 4,059,492  11/1977  Hausweiler et al. ............ 260/465.9

Primary Examiner—Alan L. Rotman
Attorney, Agent, or Firm—Louis E. Marn; Elliot M. Olstein

[57] ABSTRACT

Waste water recovered from a nitrile production effluent, containing ammonia, hydrogen cyanide, carbon dioxide and water soluble polymers is stripped of ammonia, carbon dioxide and hydrogen cyanide to produce an aqueous stream containing the water soluble polymer. At least a portion of this stream is introduced into a steam scrubber to generate steam therefrom, with scrubber bottoms and any remaining water from the stripping operation being introduced into a reboiler to provide steam for the stripping and an aqueous concentrate of the water soluble polymer. Heat for the reboiler can be provided by indirect heat transfer with steam from the scrubber which produces a condensate suitable as feed water for steam generation.

7 Claims, 1 Drawing Figure

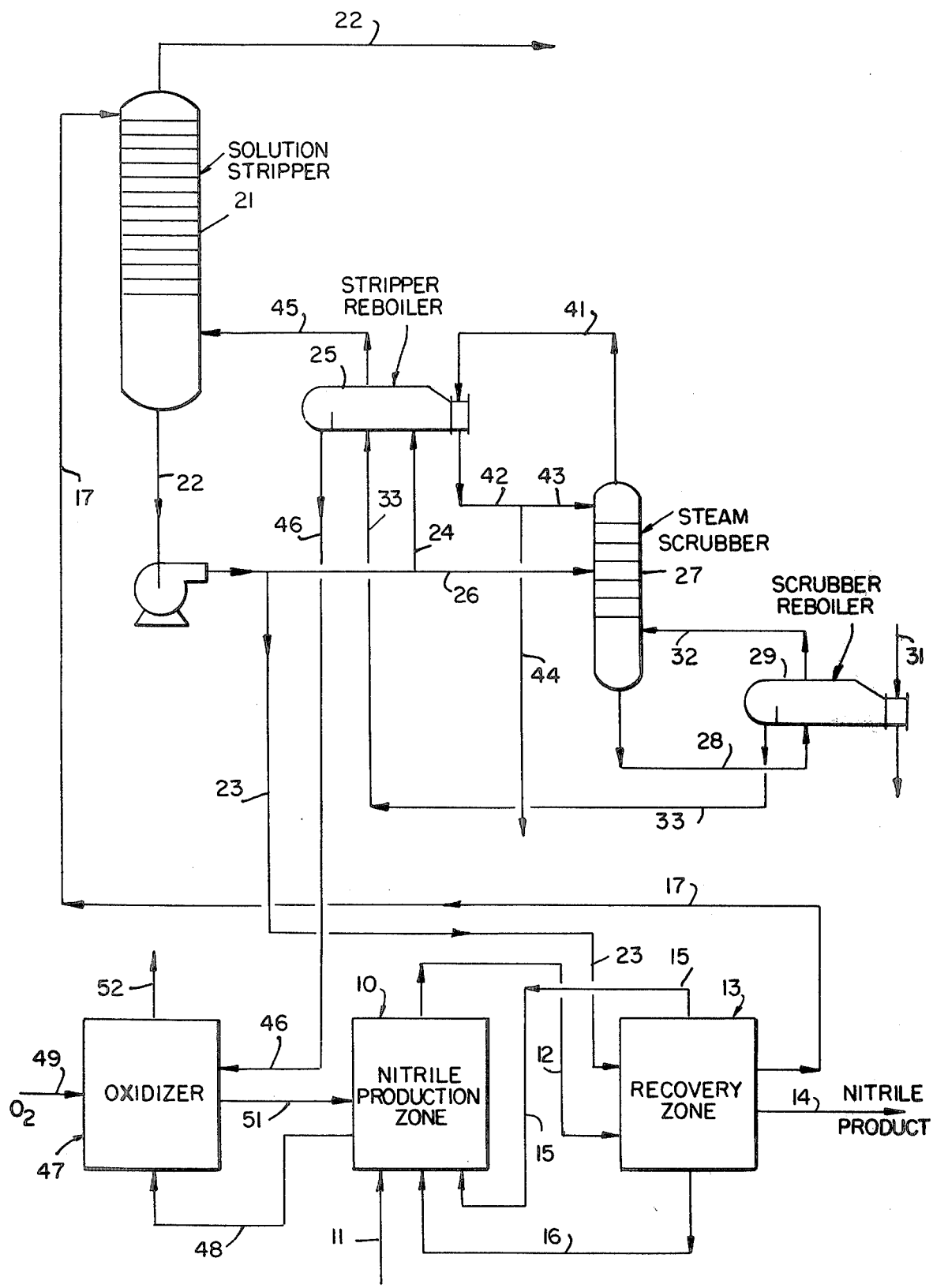

TREATMENT OF WASTE WATER FROM NITRILE PRODUCTION

This invention relates to the production of nitriles, and more particularly to a new and improved process for treatment of waste water from such nitrile production.

In the production of nitriles by an ammoxidation process, which involves reaction between an organic compound, ammonia and oxygen, (provided directly or by the use of an oxidized catalyst), there is recovered a waste water stream, which includes ammonia, carbon dioxide, hydrogen cyanide and water soluble polymers. The hydrogen cyanide, carbon dioxide and ammonia can be stripped from the water; however, the water soluble polymers which remain in the waste water present a disposal problem.

In accordance with the present invention, an aqueous stream recovered from a nitrile production effluent, containing ammonia, hydrogen cyanide, carbon dioxide and water soluble polymer is subjected to steam stripping to strip ammonia, hydrogen cyanide and carbon dioxide therefrom, and produce an aqueous stream containing water soluble polymer. At least a portion of the aqueous stream is heated to generate steam and provide a remaining aqueous stream containing water soluble polymer. The remaining aqueous stream containing water soluble polymer and a remaining portion of the aqueous stream from the steam stripping, if any, are heated to generate steam from the steam stripping and provide a remaining aqueous concentrate of the water soluble polymer. All or a portion of the heat requirements for generating steam for the steam stripping can be provided by indirect heat transfer with the steam generated from the first portion of the aqueous stream from the steam stripping operation, which produces a steam condensate free of water soluble polymer.

The aqueous concentrate of water soluble polymer may be then subjected to a suitable disposal operation; e.g., oxidation of the polymers. The steam condensate which is produced in the process is of sufficient purity for use as feed water for steam generation.

The aqueous concentrate of polymer may be suitably disposed of by introducing such aqueous concentrate into the nitrile production catalyst oxidizer, which is employed to oxidize the catalyst to a higher valent state and/or remove solid deposition products.

The aqueous solution treated in accordance with the invention is recovered from a nitrile production effluent generated in a process for producing aromatic, aliphatic or heterocyclic nitriles. As representative examples of such nitriles, there may be mentioned aromatic nitriles which contain one or more cyano groups, preferably one or two cyano groups, which can be unsubstituted or substituted with other substituent groups; for example, an alkyl group, such as phthalonitrile, terephthalonitrile, isophthalonitrile, tolunitrile, 1-cyanonaphthalene, 2,6-cyanonaphthalene, etc., or a heterocyclic nitrile containing one or more cyano groups, with the heterocyclic nucleus generally being pyridine, such as nicotinonitrile; or an aliphatic nitrile, such as acrylonitrile, methacrylonitrile etc. Such nitriles are generally produced by the ammoxidation process. The process for producing such nitriles are well known in the art and, accordingly, no details in this respect are needed for a complete understanding of the present invention.

The present invention is of particular applicability to the production of nitriles by the use of a fused catalyst, as described in U.S. Pat. No. 3,963,645, granted on June 15, 1976. The invention also has particular applicability to the production of terephthalonitrile, or isophthalonitrile, from the corresponding xylene and/or the production of nicotinonitrile.

The invention will be further described with respect to an embodiment thereof illustrated in the accompanying drawing wherein:

The drawing is a simplified schematic flow diagram of an embodiment of the present invention.

Referring now to FIG. 1 of the drawing, there is schematically illustrated a nitrile production zone, generally indicated as 10, which is provided with a suitable feed through line 11. The feed in line 11 includes an organic material to be converted to a nitrile, ammonia and may further include oxygen in the case where oxygen requirements are to be provided by gaseous oxygen. Alternatively, as hereinabove noted, oxygen requirement for the process may be provided by the use of a suitable catalyst, such as for example, oxidized vanadia on a suitable support. The preferred operation is one as described in U.S. Pat. No. 3,963,645.

The nitrile production reaction effluent is withdrawn from reaction zone 10 through line 12 and such effluent generally includes unreacted feed material, nitrile product, organic intermediates, organic byproducts, water vapor, ammonia, carbon dioxide and hydrogen cyanide, and such effluent is introduced into a recovery zone, schematically generally indicated as 13. In the recovery zone, there is recovered nitrile product through line 14, an ammonia containing recycle stream through line 15, and an organic recycle stream through line 16. In the recovery zone 13, there is also recovered an aqueous stream, containing ammonia, ammonium carbonate, ammonium cyanide, some volatile organics, and water soluble polymers such as diiminoethylene 1,3,5-triazine and aminomalonodinitrile. The operation of such a recovery zone is known in the art, and forms no part of the present invention. In general, in recovery zone 13, the nitrile production effluent is contacted with a suitable quench liquid to recover a liquid stream containing nitrile product, and a gaseous stream containing organics, as well as water vapor, carbon dioxide, ammonia and hydrogen cyanide. The remaining gaseous stream is then further cooled to separate an organic condensate, an aqueous condensate, which contains ammonium carbonate and ammonium cyanide, as well as some water soluble polymers, and a remaining ammonia containing gaseous recycle stream.

The aqueous stream, containing ammonia, carbon dioxide, hydrogen cyanide, as well as volatile organics and water soluble polymers, in line 17 is introduced into a stripper, schematically generally indicated as 21. The stripper 21 is operated at conditions to strip all of the volatiles from the aqueous stream, and provide a water stream free of such volatiles, including cyanide, with such aqueous stream, including water soluble polymers. In general, the stripper 21 is operated at a temperature of from about 180° F. to about 275° F. and a pressure of from about 18 psia to 45 psia. It is to be understood, however, that the scope of the invention is not limited to such conditions.

Volatile organics, including ammonia, carbon dioxide and hydrogen cyanide, as well as water vapor, is withdrawn from stripper 21 through line 22 for further treatment.

An aqueous stream, containing water soluble polymer, is withdrawn from solution stripper 21 through line 22. A portion of such stream may be introduced into the recovery zone 13 through line 23 as absorption water. It is to be understood, however, that in some cases, it will not be necessary to employ any portion of the aqueous stream as absorption water for the recovery zone 13.

All or a portion of the aqueous stream in line 26 is introduced into a steam scrubber, schematically generally indicated as 27. In steam scrubber 27, the stream is heated to generate steam therefrom and provide an aqueous bottoms stream containing water soluble polymer. In general, the steam scrubber is operated at a temperature in the order of from about 250° F. to about 325° F. and at a pressure of from about 30 psig to about 100 psia.

An aqueous bottoms stream, containing water soluble polymer, is withdrawn from steam scrubber 27 through line 28, and introduced into the scrubber reboiler schematically generally indicated as 29. In scrubber reboiler 29, a portion of the bottoms is vaporized by indirect heat transfer with a suitable heat transfer agent, such as steam in line 31. The steam generated in the reboiler is returned to the steam scrubber 27 through line 32 to provide heat requirements therefor.

A net aqueous bottoms stream, containing water soluble polymer, is withdrawn from reboiler 29 through line 33 and introduced into reboiler 25. Any portion of the aqueous stream withdrawn from the solution stripper 21 which was not introduced into the steam scrubber 27 is introduced into reboiler 25 through line 24.

The steam generated in steam scrubber 27 is withdrawn through line 41, and passed through reboiler 25 in an indirect heat transfer relationship to provide heating requirements for such reboiler. As a result, such steam is condensed, with the condensed steam being withdrawn from the reboiler through line 42.

A portion of the condensate is returned to steam scrubber 27 through line 43 in order to effect scrubbing of steam generated therein to insure that the steam withdrawn through line 41 is essentially free of water soluble polymers.

A further portion of the condensate is recovered through line 44, with such condensate being of sufficient purity for use for steam generation.

The steam generated in reboiler 25 is withdrawn therefrom through line 45 and introduced into the solution stripper 21 to effect steam stripping of the aqueous solution introduced through line 17.

An aqueous concentrate of the water soluble polymer is withdrawn from the reboiler 25 through line 46, and such concentrate may then be further treated in order to effect removal of water soluble polymers.

In accordance with the specific embodiment, such concentrate of water soluble polymer is introduced into the oxidizer for the nitrile production catalyst, schematically generally indicated as 47. The oxidizer 47 is periodically or continuously provided with nitrile production catalyst from nitrile production zone 10 through line 48. In addition, the oxidizer is provided with oxygen through line 49. As a result of the contact with the oxygen, impurities present in the catalyst, and water soluble polymer introduced through line 46 are effectively oxidized. In accordance with the preferred embodiment, in which a fused vanadia catalyst is employed, the oxidation in zone 47 maintains the vanadia in the oxidized valent state for the nitrile production operation. The regenerated catalyst is returned to zone 10 through line 51 and volatiles are withdrawn from the oxidizer 47 through line 52.

Although the invention has been described with respect to a specific embodiment thereof, it is to be understood that the present invention is not limited to such an embodiment. Thus, for example, the aqueous stream in line 17 may be subjected to a hydrolysis operation, prior to being introduced into the solution stripper, in order to convert a portion of the hydrogen cyanide to ammonia and carbon monoxide.

Similarly, it may be possible to provide heat requirements for the stripper reboiler other than by the use of steam from the scrubber.

These and other modifications should be apparent to those skilled in the art from the teachings herein.

The invention will be further described with respect to the following example; however, the scope of the invention is not to be limited thereby:

EXAMPLE

The present invention is particularly advantageous in that it reduces the volume of a large amount of a stripped waste water, containing a small amount of ammonium cyanide and water soluble polymers which is troublesome for treatment while also producing pure condensate suitable for steam generation.

A typical net stripped waste water stream 26 of 3,000 pounds contains traces of ammonium cyanide, ammonia, carbon dioxide and 10 pounds of water soluble polymers. This stream is reduced in accordance with the invention to 100 pounds of waste stream 46 containing traces of ammonium cyanide, ammonia, carbon dioxide and 10 pounds of water soluble polymers. This amount of waste water can be easily handled in the oxidizer 47. The remainder of the waste water stream 26 is converted to 2900 pounds of pure condensate stream 44. The high purity of stream 44 is achieved by refluxing the top section of steam scrubber 27 with pure condensate stream 43.

Numerous modifications and variations of the present invention are possible in light of the above teachings and, therefore, within the scope of the appended claims, the invention may be practised otherwise than as particularly described.

I claim:

1. In a process for producing nitriles wherein there is recovered an aqueous stream containing non-strippable water soluble polymers and steam strippable volatile components, the improvement comprising:
   (a) steam stripping the strippable volatile components from the aqueous stream to provide an aqueous stream containing non-strippable water soluble polymer;
   (b) generating steam from at least a portion of the aqueous stream from step (a) to provide a remaining aqueous portion containing water soluble polymer;
   (c) generating steam from remaining aqueous portion produced in (b) to provide a remaining aqueous concentrate of non-strippable water soluble polymer, at least a portion of the heat requirements therefor being provided by indirect heat transfer with steam generated in (b) to condense steam from (b) to a steam condensate essentially free of polymers; and
   (d) employing steam generated in step (c) for steam stripping in step (a).

2. The process of claim 1 wherein a portion of the steam condensate is employed for scrubbing steam generated in step (b) prior to use thereof to provide heat requirements in step (c).

3. The process of claim 2 wherein a portion of the aqueous stream produced in step (a) is employed in step (b), with the remainder being employed in step (c).

4. The process of claim 2 wherein the remaining aqueous concentrate is passed to an oxidation step in the nitrile production to oxidize the polymer.

5. The process of claim 1 wherein the steam strippable volatile components is comprised of ammonia, hydrogen cyanide, and carbon dioxide.

6. The process of claim 5 wherein the nitrile produced is selected from the group consisting of terephthalonitrile and isophthalonitrile.

7. The process of claim 5 wherein the nitrile produced is nicotinonitrile.

* * * * *